Figure 2:
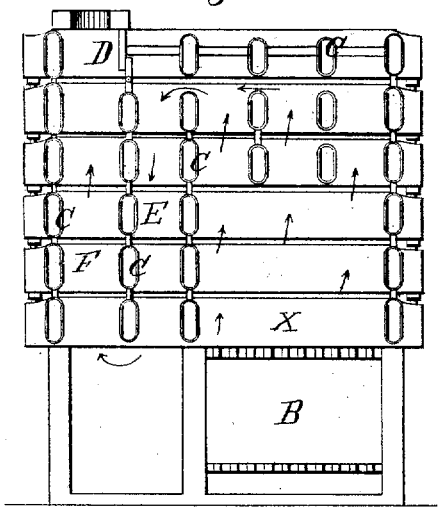

H. HOWARD.

Hot-Water Heating Apparatus.

No. 5,897. Reissued June 2, 1874.

Witnesses.
Geo. T. Smallwood, Jr.
Carlos Hickenlooper

Inventor.
Henry Howard.
per John J. Halsted.
Atty.

AM. PHOTO-LITHOGRAPHIC Co. N. Y. (OSBORNE'S PROCESS.)

UNITED STATES PATENT OFFICE.

HENRY HOWARD, OF SPRINGFIELD, MASSACHUSETTS.

IMPROVEMENT IN HOT-WATER HEATING APPARATUS.

Specification forming part of Letters Patent No. 60,732, dated January 1, 1867; reissue No. 5,897, dated June 2, 1874; application filed April 16, 1874.

*To all whom it may concern:*

Be it known that I, HENRY HOWARD, of Springfield, Hampden county, Commonwealth of Massachusetts, have invented certain new and useful Improvements in Hot-Water Heating Apparatus; and I do hereby declare that the following is a full and exact description thereof, reference being had to the accompanying drawings and to the letters of reference marked thereon.

The invention relates to a new construction of boilers and radiators, and to the relative arrangement of the boiler-tubes.

In my invention I form each boiler-tube with a projecting fin or rib upon one or each side, and place the tubes in vertical series, one tube upon another, the fin-pieces abutting and forming, in connection with the tubes, the walls of the flue-spaces. I also use a radiator formed as a long loop, or with an oblong circumscribed space, one end of the radiator having a neck, by which the radiator is attached, and through which the steam or hot water passes to and from the respective parts of the radiator.

The invention consists, primarily, in the boiler made of the tubes placed vertically, one upon another, and so as to constitute walls of the flue, or flame-and-smoke chamber, and in the peculiar radiator.

The drawing represents an apparatus embodying the invention.

Figure 1:
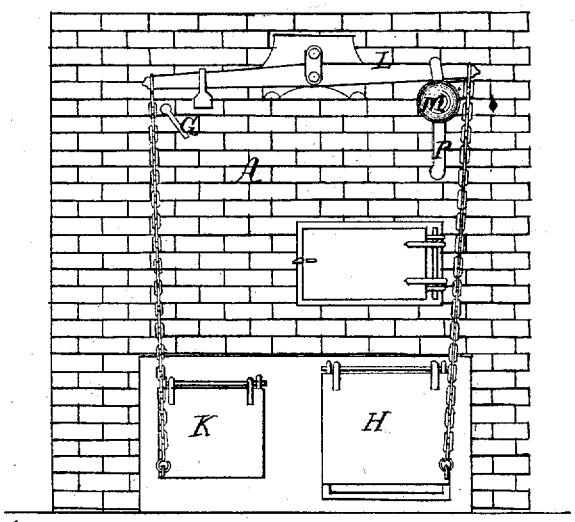
Figure 3:
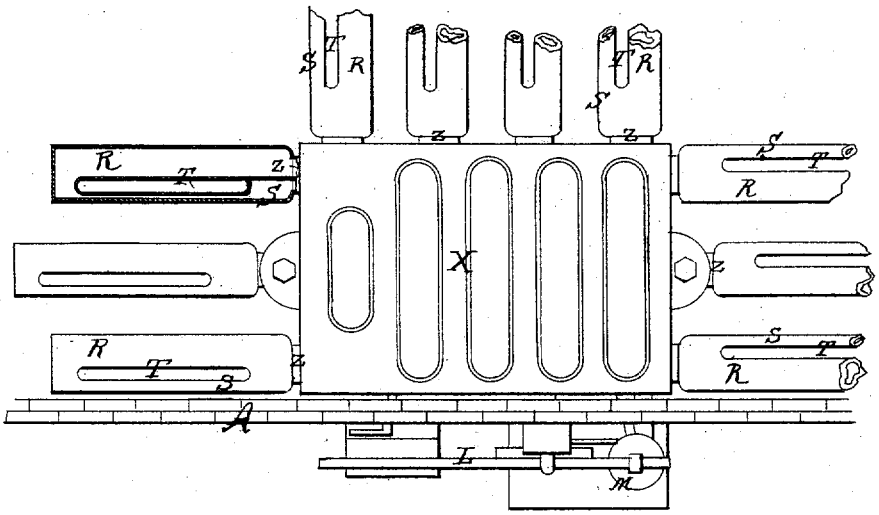

Figure 1 is a front view of it. Fig. 2 is a vertical section of it. Fig. 3 is a plan of it.

A denotes the brick-work that incloses the boiler-tubes and the fire-pot, and the flue, flame, and smoke spaces around the boiler-tubes. B denotes the fire-pot. Over the fire-pot, and between the walls, I place the main boiler-tubes X, these tubes being made with fins or ribs that form close-fitting butt-joints, so that each tier of tubes makes a wall for contact of the flames and other volatile products of combustion. The tubes are connected by cross-tubes C. D denotes a damper, so arranged as, when opened, to allow the flame and heated air to pass directly up into the chimney through the damper-opening; but, when shut, causing the flames, &c., to pass down the flue E, and around up through the flue F. When the damper is to be moved, it is operated by a handle, G. Besides the regulation of this damper D, I have another method, used in connection with it, for more fully regulating the draft. This consists of the two doors or dampers H K, the one, H, opening into fire-grate B, and admitting air up through the fire, thus increasing the heat by the draft, and the other, K, opening underneath the chimney, so as to allow the cold air to draw directly up into the chimney, thus decreasing the draft, and consequently the heat. To accomplish a perfect regulation of the heat by means of these doors, I connect them with either end of a lever, L, which is pivoted to the front wall of the chamber. In order to operate this lever, and close one door, opening the other at the same time, I attach to one end of the lever a hollow globe, M, which is balanced by weights on the other end. To this globe I attach an elastic pipe, P, which is also attached to one of the boilers, so that when sufficient steam is generated to form the requisite pressure water is forced up this elastic pipe P into the globe M. In this case the globe becomes heavier, weighing down that end of the lever, closing the door H, and opening, by the rise of the other end of the lever in the same operation, the other door, K. By these means a perfect regulation of the draft is obtained. The radiators are shown as extending from the boiler on its sides and rear. Each radiator is shown as divided by a long opening or slot, T, so as to form an elongated ring or loop R S, denoting the long parts of each radiator. At one end of each radiator is a neck, Z, preferably screw-threaded, by which the radiator is attached. The parts R S form two chambers in each radiator, the neck communicating with both chambers, steam or hot water passing into one chamber through the neck, and thence into the other chamber, at the end opposite the neck, and through said chamber and the neck, the neck having a central partition to regulate the passage of the steam or water through one part of the neck into one chamber of the radiator, and from the other chamber of the radiator through the other part of the neck.

In the drawing, the part R is shown as made larger than the part S, and the part S, having proportionally to its bulk a larger surface exposed to the action of the air, becomes, consequently, cooled faster than the water in the part R, thereby accelerating the circulation through the radiator.

I claim—

1. The boiler-tubes placed in vertical tiers, and with their ribs or fins forming continuous walls of the flue or flame chamber, substantially as shown and described.

2. The series of boiler-tubes placed vertically one upon another, and connected by the cross-tubes C, substantially as shown and described.

3. The combination, with a boiler, of a hollow vessel, connected directly with the boiler by means of a flexible pipe, arranged and operating for the purpose of regulating the fire by the flow of water into such vessel, substantially as described.

4. The radiators formed as described, having one part, R, larger than the other part, S, substantially as herein set forth.

5. The radiator made in the form of an elongated ring or loop, leading from a single tubular neck, by which the radiator is attached.

HENRY HOWARD.

Witnesses:
GIDEON WELLS,
C. M. CARTER.